(12) United States Patent
Gervais et al.

(10) Patent No.: US 8,081,884 B2
(45) Date of Patent: Dec. 20, 2011

(54) RATE ADJUSTABLE DIFFERENTIAL PHASE SHIFT KEY (DPSK) MODULATION

(75) Inventors: David R. Gervais, Norwood, MA (US);
Jeffrey R. Minch, Nashua, NH (US);
Daniel J. Townsend, Lowell, MA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 12/879,902

(22) Filed: Sep. 10, 2010

(65) Prior Publication Data
US 2011/0008057 A1   Jan. 13, 2011

Related U.S. Application Data

(62) Division of application No. 11/388,203, filed on Mar. 24, 2006, now Pat. No. 7,817,924.

(51) Int. Cl.
*H04B 10/06* (2006.01)
(52) U.S. Cl. ............ 398/202; 398/77; 398/205
(58) Field of Classification Search ........ 398/75, 398/77, 102, 202–214
See application file for complete search history.

(56) References Cited

U.S. PATENT DOCUMENTS

| | | | |
|---|---|---|---|
| 5,768,307 A * | 6/1998 | Schramm et al. | 375/150 |
| 7,233,430 B2 * | 6/2007 | Caplan | 359/325 |
| 2005/0185968 A1 * | 8/2005 | Dorrer et al. | 398/188 |
| 2006/0274320 A1 * | 12/2006 | Caplan | 356/491 |

* cited by examiner

*Primary Examiner* — Dzung Tran
(74) *Attorney, Agent, or Firm* — Sterne, Kessler, Goldstein & Fox P.L.L.C.

(57) ABSTRACT

In a fixed delay optical communication system, rate adjustable differential phase shift key (DPSK) techniques eliminate the need for multiple comparing modules, each corresponding to a different data rate. Setting alternative data rates at integer multiples of the fundamental data rate of the optical communication system allows the system to process the respective integer number of symbols per period of the system, wherein the period of the system is the inverse of the fundamental data rate. Pulse carving techniques may be used to set the duty cycle of clock levels associated with a clock signal. The clock levels may be combined with respective symbols to provide optical symbols having a duty cycle less than 100%.

18 Claims, 20 Drawing Sheets

RATE ADJUSTABLE DIFFERENTIAL PHASE SHIFT KEY (DPSK) MODULATION

CROSS-REFERENCE TO RELATED APPLICATIONS

This application is a divisional of U.S. Non-Provisional application Ser. No. 11/388,203 filed Mar. 24, 2006, now allowed, which is hereby incorporated by reference in its entirety.

STATEMENT REGARDING FEDERALLY-SPONSORED RESEARCH AND DEVELOPMENT

Part of the work performed during development of this invention utilized U.S. Government funds. The U.S. Government has certain rights in this invention.

BACKGROUND OF THE INVENTION

1. Field of the Invention

The present invention relates generally to modulation, and more specifically to rate adjustable differential phase shift key (DPSK) modulation.

2. Background

Optical broadband communication systems generally transmit optical signals through the atmosphere via free space optical communication (FSOC) links and/or through fiber via fiber-optic communication (FOC) links. While such links have many beneficial characteristics, they are also susceptible to a variety of factors that may negatively affect their performance.

For example, most fixed and mobile FSOC links are susceptible to atmospheric variability. Changes in weather conditions (e.g., fog, dust, rain, clouds, etc.) or even free space path loss in a mobile environment can have a significant impact on available link margin. Other less predictable atmospheric conditions, such as turbulence or scintillation, can also substantially affect system performance.

Many techniques have been employed to mitigate channel effects associated with FSOC and FOC links. One such technique involves trading link margin for throughput. This technique has been demonstrated using binary pulse-position modulation (BPPM). However, BPPM does not provide adequate sensitivity. Fixed-rate DPSK has been used to achieve near-quantum limited performance, but attempts to achieve rate adaptability have proven cumbersome and involve the use of many integrated waveguides.

There is a need for rate adjustable DPSK systems and methods that addresses one or more of the aforementioned shortcomings of conventional optical broadband communication systems and methods.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the pertinent art(s) to make and use the invention.

In the drawings, like reference numbers indicate identical or functionally similar elements. Additionally, the leftmost digit(s) of a reference number identifies the drawing in which the reference number first appears.

DETAILED DESCRIPTION OF THE INVENTION

Figure 1:
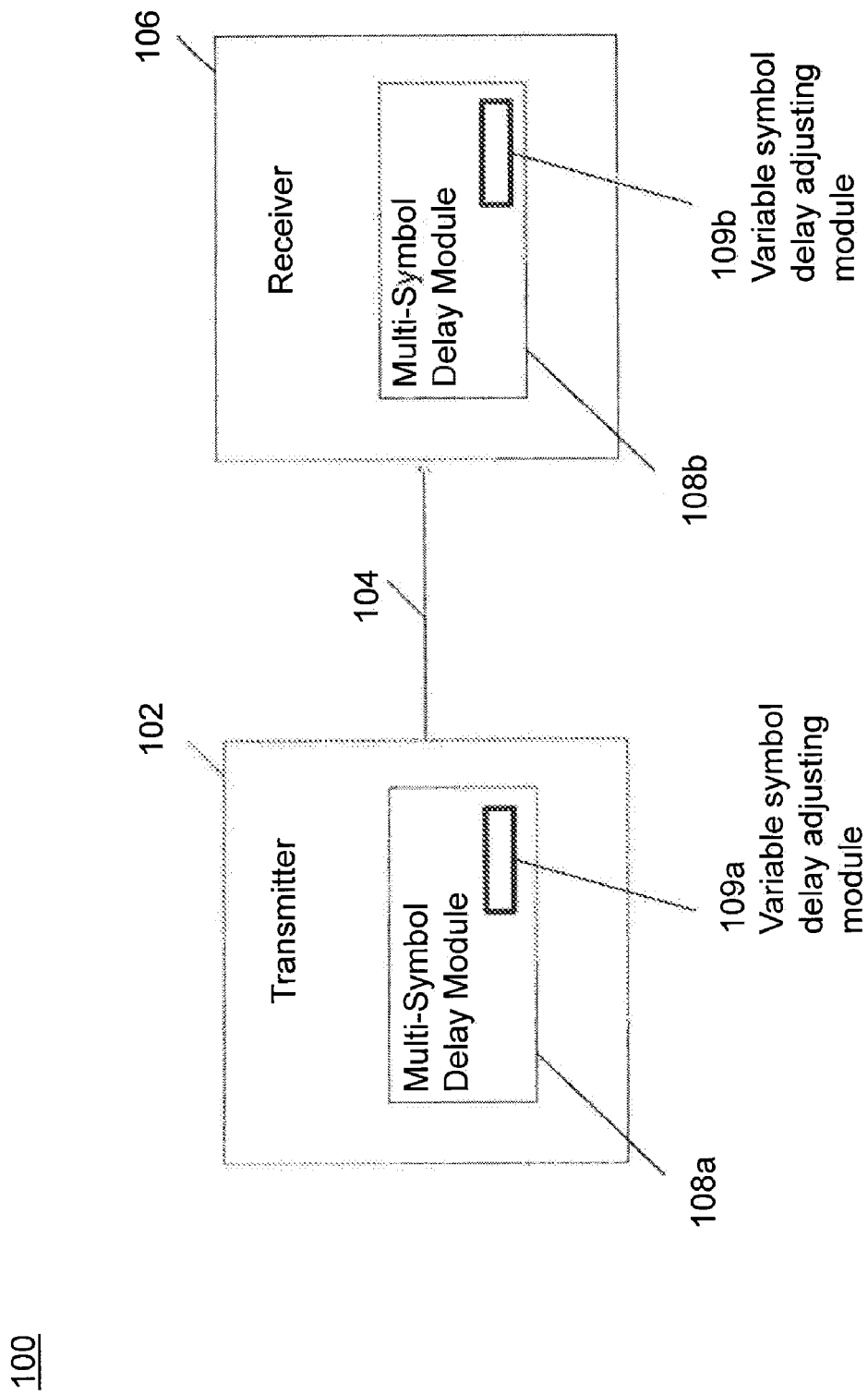
FIG. 1 is a block diagram of an example rate adjustable differential phase shift key (DPSK) communication system 100, according to an embodiment of the present invention.

Although the embodiments of the invention described herein refer specifically, and by way of example, to optical broadband communication systems, including FOC and FSOC links, it will be readily apparent to persons skilled in the relevant art(s) that the invention is equally applicable to other systems. It will also be readily apparent to persons skilled in the relevant art(s) that the invention is applicable to any apparatus or system that employs a differential phase shift key (DPSK) technique.

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

I. Overview

DPSK is a technique in which the phase of a first portion of a received signal and the phase of a second portion of the received signal are compared to provide information. The phase of each portion of the signal is represented by one or more bits, depending on the accuracy of the DPSK technique. The one or more bits are referred to as a symbol.

An n-bit DPSK technique utilizes $2^n$ phase states, where n may be any integer value. In a system using 1-bit DPSK, the phase may be 0 or $\pi$, where the first phase state is 0 and the second phase state is $\pi$. In a system using 2-bit DPSK, the phase may be 0, $\pi/2$, $\pi$, or $-\pi/2$. The aforementioned phase states are provided for illustrative purposes and are not intended to limit the scope of the present invention.

A DPSK technique may be a non-return-to-zero (NRZ) DPSK technique or a return-to-zero (RZ) DPSK technique. In an NRZ-DPSK technique, the optical power in each bit occupies substantially the entire bit slot. In an RZ-DPSK technique, the optical power in each bit is "carved" such that the optical power appears as a pulse within the bit slot. For example, the duty cycle associated with a bit may be reduced, such that the optical power in the bit occupies less than the entire bit slot.

In conventional DPSK systems and methods, data is encoded using the phase difference between adjacent symbols. The symbols are then demodulated with a one-symbol delay interferometer. Traditionally, to change the line rate (i.e., the rate at which a DPSK-encoded signal is modulated/demodulated), an additional interferometric delay must be introduced. Embodiments of the present invention eliminate the need for multiple interferometric delays.

Figure 14:
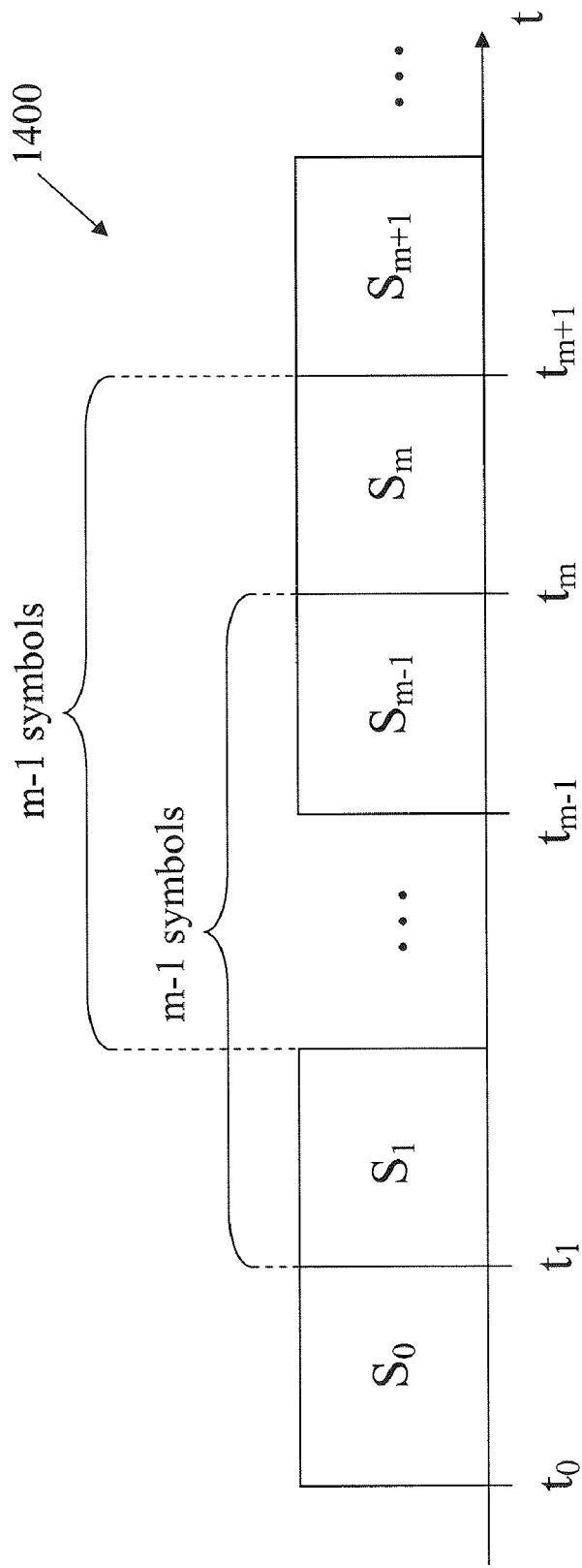
FIG. 14 illustrates a signal having multiple symbols according to an embodiment of the present invention.

FIG. 14 illustrates a signal 1400 having multiple symbols ($S_0$, $S_1$, etc.) according to an embodiment of the present invention. Referring to FIG. 14, symbol $S_0$ corresponds with time instance $t_0$, symbol $S_1$ corresponds with time instance $t_1$, and so on. For a DPSK technique utilizing an m-symbol delay, symbol $S_0$ is delayed for a time period corresponding to m symbols and is compared to symbol $S_m$. Symbol $S_1$ is delayed for a time period corresponding to m symbols and is compared to symbol $S_{m+1}$, and so on. As shown in FIG. 14, symbols that are compared to each other are temporally separated by m−1 symbols.

Figure 5:
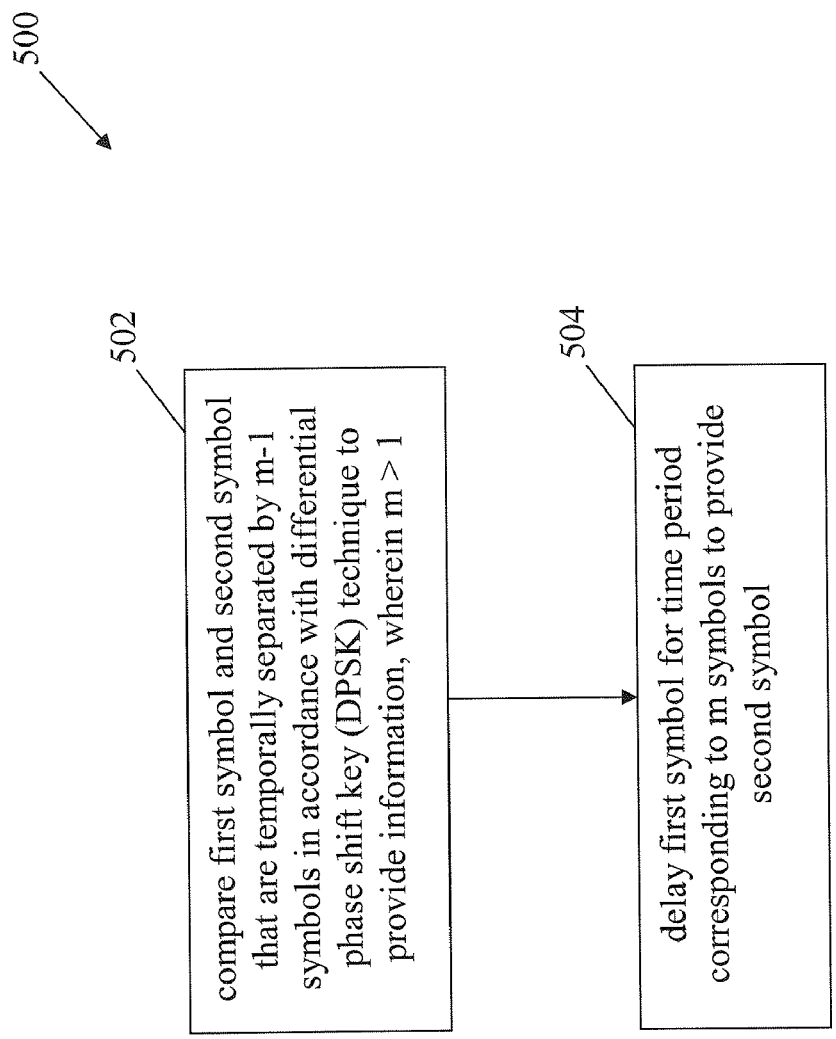
FIGS. 5-8 are flowcharts of methods of performing respective DPSK techniques in accordance with embodiments of the present invention.

FIG. 5 is a flowchart of a method of performing the DPSK technique illustrated in FIG. 14. The invention, however, is not limited to the description provided by the flowchart 500. Rather, it will be apparent to persons skilled in the relevant art(s) from the teachings provided herein that other functional flows are within the scope and spirit of the present invention.

Referring now to FIG. 5, at step 502, a first symbol and a second symbol that are temporally separated by m−1 symbols are compared in accordance with a DPSK technique to provide information, wherein m>1. At step 504, the first symbol is delayed for a time period corresponding to m symbols to provide the second symbol.

According to embodiments of the present invention, the variable m may be adjusted based on the rate at which data is modulated/demodulated in accordance with the multi-symbol DPSK technique. For example, the variable m may be represented as $$m = \frac{R_{data}}{R_{fund}},$$

wherein $R_{data}$ is the rate at which data is modulated/demodulated in accordance with the multi-symbol DPSK technique, and $R_{fund}$ is the rate corresponding to a one-symbol DPSK technique (i.e., m=1). Accordingly, a change of data rate is proportional to a change of m.

II. Example Rate Adjustable DPSK Embodiments

FIG. 1 is a block diagram of an example rate adjustable DPSK communication system 100, according to an embodiment of the present invention. In FIG. 1, transmitter 102 transmits an optical communication signal via optical communication link 104 to receiver 106. Transmitter 102 includes a first multi-symbol delay module 108a. Receiver 106 includes a second multi-symbol delay module 108b. Multi-symbol delay modules 108a-b may include software, hardware, firmware, or any combination thereof. According to an embodiment multi-symbol delay modules 108a-b include variable symbol delay adjusting modules 109a-b, respectively, that are configured to adjust variable m based on the rate at which, data is modulated/demodulated in accordance with the multi-symbol DPSK technique. Optical communication link 104 may be fiber or free-space, to provide some examples.

Transmitter 102 modulates the optical communication signal using a multi-symbol DPSK technique. A multi-symbol DPSK technique is defined to be a DPSK technique that is capable of comparing non-adjacent symbols of a signal. In transmitter 102, multi-symbol delay module 108a provides a multi-symbol delay, as described above with respect to FIG. 14. Multi-symbol delay module 108a enables transmitter 102 to modulate the optical communication signal in accordance with the multi-symbol DPSK technique.

Receiver 106 demodulates the optical communication signal using a multi-symbol DPSK technique. In receiver 106, multi-symbol delay module 108b provides the multi-symbol delay, as described above with respect to FIG. 14. Multi-symbol delay module 108b enables receiver 106 to demodulate the optical communication signal in accordance with the multi-symbol DPSK technique.

Figure 2:
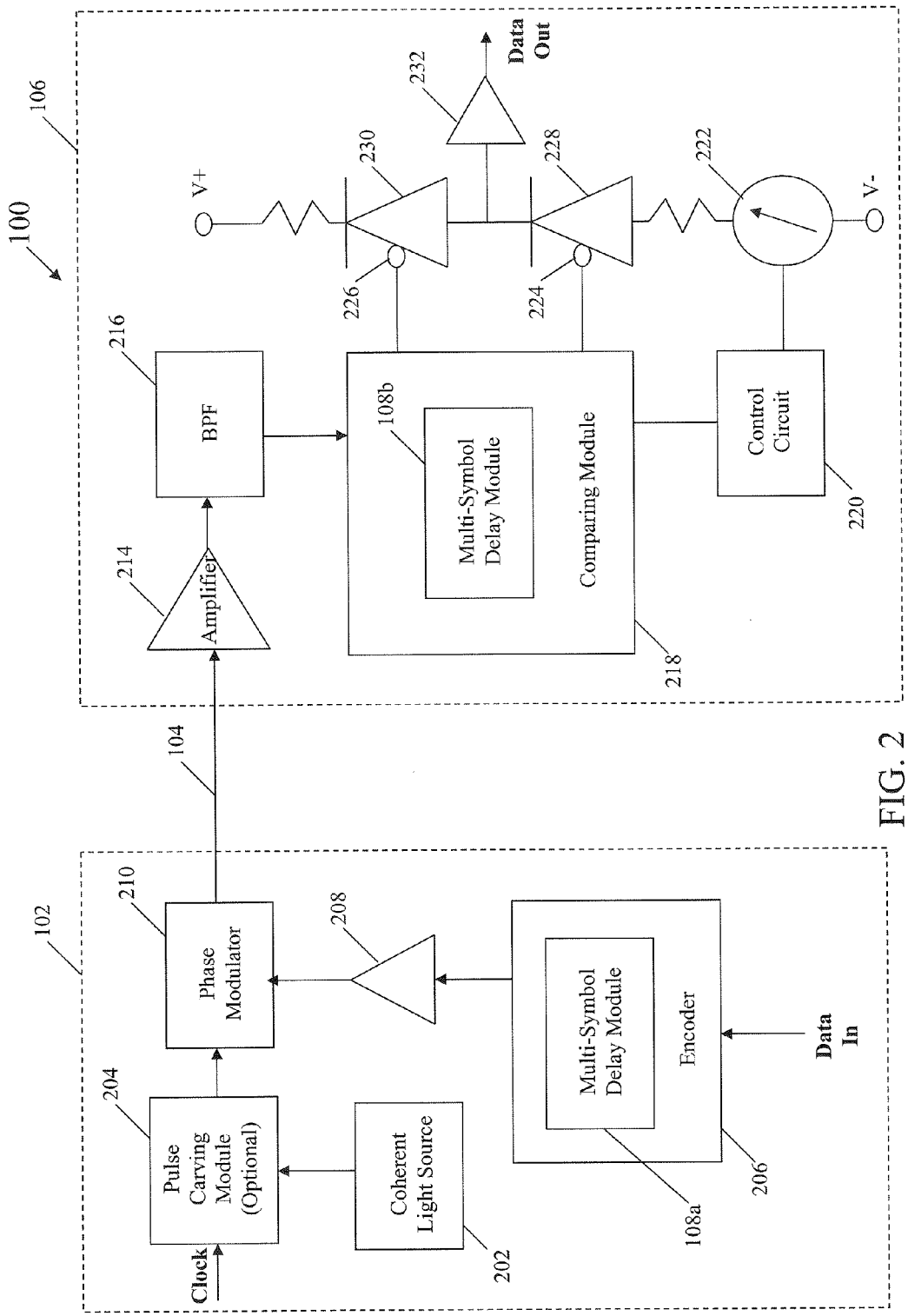
FIG. 2 is a more detailed block diagram of the example rate adjustable DPSK communication system 100 shown in FIG. 1, according to an embodiment of the present invention.

FIG. 2 is a more detailed block diagram of the example rate adjustable DPSK communication system 100 shown in FIG. 1. In FIG. 2, transmitter 102 includes a coherent light source 202, an optional pulse carving module 204, an encoder 206, a modulation driver 208, and a phase modulator 210. Coherent light source 202 provides coherent light. Pulse carving module 204 processes the coherent light to provide a plurality of clock levels, each having a duty cycle less than 100%. Pulse carving module 204 is optional, depending on whether transmitter 102 implements a RZ-DPSK technique or a NRZ-DPSK technique. For example, pulse carving module 204 is not necessary to implement a NRZ-DPSK technique, because a NRZ-DPSK symbol has a duty cycle of substantially 100%. If a RZ-DPSK technique is used, then phase modulator 210 receives a first optical signal having a first phase from pulse carving module 204. If a NRZ-DPSK technique is used, then phase modulator 210 receives the first optical signal having the first phase from coherent light source 202.

Encoder 206 processes a data signal in accordance with a multi-symbol DPSK technique to provide an encoded signal. Encoder 206 includes a multi-symbol delay module 108a that provides the multi-symbol delay used by encoder 206 to perform the multi-symbol DPSK technique. Modulation driver 208 provides a second signal having a second phase based on the encoded signal.

Phase modulator 210 provides an optical communication signal based on the first phase and the second phase. The optical communication signal is provided to receiver 106 via optical communication link 104.

In FIG. 2, receiver 106 includes an amplifier 214, a bandpass filter (BPF) 216, a comparing module 218, a control circuit 220, a current meter 222, a difference node 224, a sum node 226, a first diode 228, a second diode 230, and a transimpedance amplifier 232. Amplifier 214 amplifies the optical communication signal received from transmitter 102. BPF 216 filters out-of-band noise to provide a filtered optical signal. Comparing module 218 compares first and second non-adjacent symbols of the filtered optical signal. Comparing module includes multi-symbol delay module 108b that provides the multi-symbol delay used by comparing module 218 to determine the temporal separation between the first and second symbols.

Referring to FIG. 2, comparing module 218 provides the sum of the first and second symbols to summing node 226 and the difference between the first and second symbols to difference node 224. First diode 228 provides a first current signal based on the difference between the first and second symbols. Second diode 230 provides a second current signal based on the sum of the first and second symbols. Transimpedance amplifier 232 receives a current signal that is substantially equal to the difference between the second current signal and the first current signal. Transimpedance amplifier 232 converts the received current signal to a voltage signal corresponding to the data signal processed by transmitter 102.

Current meter 222 is coupled to first diode 228 to detect the first current. Current meter 222 provides a control current to control circuit 220 based on the first current. Control circuit 220 provides a control signal to comparing module 218 based on the control current to compensate for phase drift in comparing module 218.

In an experiment using the example rate adjustable DPSK communication system 100 shown in FIG. 2, a tunable external cavity laser (ECL) was used as coherent light source 202. The ECL was tuned to a wavelength of 1550 nm. A pseudo random bit sequence (PRBS) was amplified using modulation driver 208, which drove phase modulator 210. Phase modulator 210 was implemented as a lithium niobate ($LiNbO_3$) phase modulator having $V\pi\approx 8V$. The received phase modulated signal was then pre-amplified with amplifier 214, which was implemented as an erbium-doped fiber amplifier (EDFA). Out-of-band amplified spontaneous emission (ASE) noise introduced by the EDFA was filtered using BPF 216, which was implemented as a 100 GHz channel spaced arrayed waveguide router (AWGR). Comparing module 218 was implemented as a fiber-based Mach-Zehnder interferometer, utilizing two 50/50 fiber couplers. One arm of the interferometer included a spool of single mode fiber (~10 m), while the other arm included a piezo-electric fiber stretcher. The fiber stretcher provided a fine-control stabilization mechanism which maximized fringe visibility and provided noise rejection caused by fluctuating temperatures and acoustic vibrations. The optical signal was detected on the constructive port of the interferometer using a PIN diode. The converted electrical signal was then split into two paths. One path fed control circuit 220 which provided a corrective voltage to the fiber stretcher to compensate for phase drift. The other path was used to create eye-diagrams on a high-speed sampling oscilloscope. The present invention, however, is not limited to the specific implementations used in this experiment.

Figure 3:
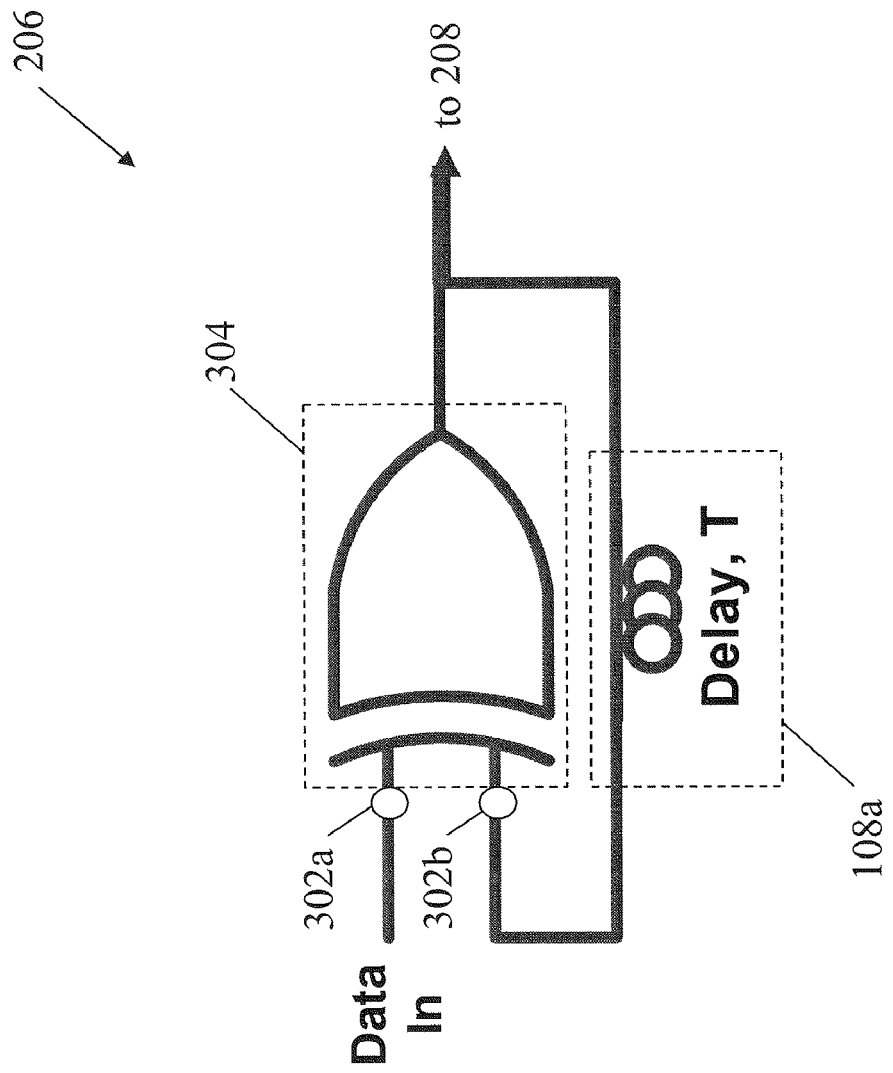
FIG. 3 illustrates the encoder of FIG. 2 according to an example embodiment of the present invention.

FIG. 3 illustrates encoder 206 of FIG. 2 according to an example embodiment of the present invention. In FIG. 3, encoder 206 includes a comparing module 304 and first multi-symbol delay module 108a. Comparing module 304 has first and second input nodes 302a-b, respectively. Comparing module 304 provides as an output a first symbol at a first time instance $t_0=0$. First multi-symbol delay module 108a delays the first symbol for a time period $\tau=m$ (i.e., a time period corresponding to m symbols) to provide a delayed symbol at second input node 302b. A data symbol is received at first input node 302a. Comparing module 304 compares the delayed symbol and the data symbol to provide a second symbol in accordance with a DPSK technique at a second time instance $t_m=m$. In an example, the first symbol corresponds with a first portion of an optical signal having a first phase and the second symbol corresponds with a second portion of the optical signal having a second phase.

In the embodiment of FIG. 3, m is an integer greater than one, and each symbol has a duration of $t=1$. Comparing module 304 is shown to be an exclusive-OR gate for illustrative purposes and is not intended to limit the scope of the present invention. Persons skilled in the relevant art(s) will recognize that comparing module 304 may perform any compare operation.

Figure 4A:
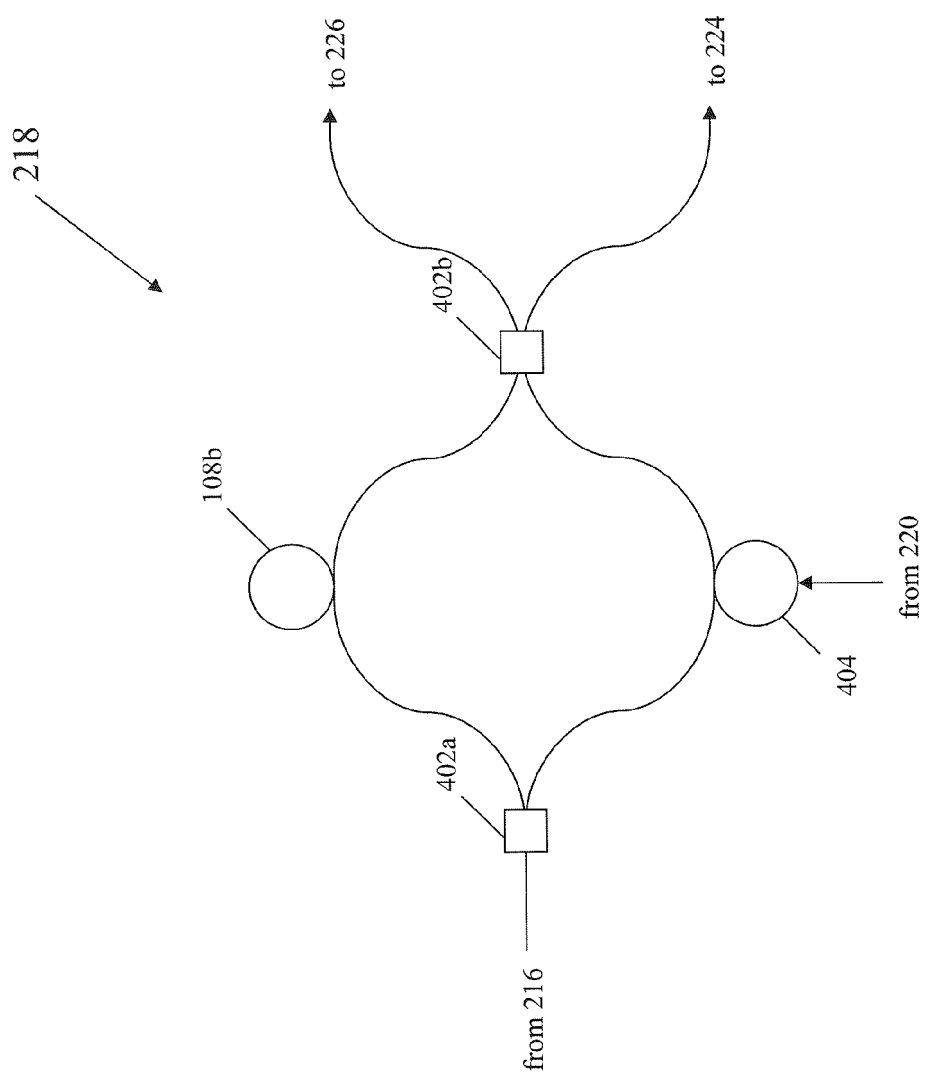
FIGS. 4A and 4B illustrate the comparing module of FIG. 2 according to an embodiment of the present invention.

FIG. 4A illustrates comparing module 218 of FIG. 2 according to an embodiment of the present invention. In FIG. 4A, comparing module 218 is shown to be a multi-symbol interferometer for illustrative purposes. Referring to FIG. 4A, comparing module 218 includes respective first and second nodes 402a-b, second multi-symbol delay module 108b, and a fiber stretcher 404. Second multi-symbol delay module 108b and fiber stretcher 404 are coupled in parallel between first node 402a and second node 402b. Second multi-symbol delay module 108b is along a first path, and fiber stretcher 404 is along a second path.

Node 402a receives a first symbol at a first time instance $t_0=0$ and a second symbol at a second time instance $t_m=m$, wherein m is an integer greater than one, and each symbol has a duration of $t=1$. Node 402a provides the first and second symbols to second multi-symbol delay module 108b and fiber stretcher 404.

Second multi-symbol delay module 108b delays the first symbol for a time period $\tau=m$ and provides the first symbol to second node 402b. Fiber stretcher 404 piezo-electrically modulates the optical path length of the second path to stabilize comparing module 218. Fiber stretcher 404 provides the second symbol to second node 402b. Second node 402b compares the first symbol and the second symbol in accordance with a DPSK technique to provide information. In an example, the information includes a sum of the first and second symbols and a difference between the first and second symbols. In another example, the first symbol corresponds with a first portion of an optical signal having a first phase and the second symbol corresponds with a second portion of the optical signal having a second phase.

Figure 4B:
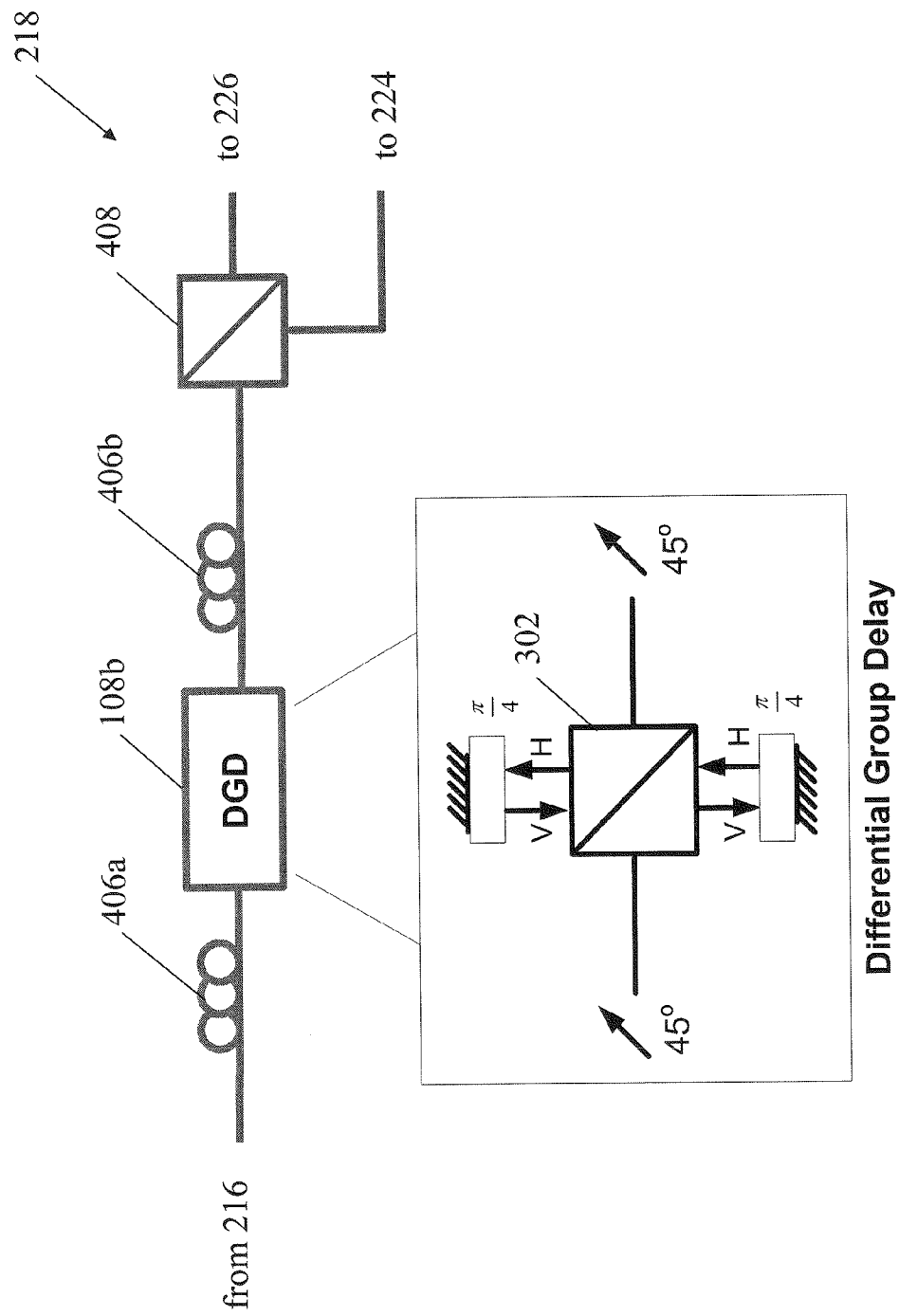

FIG. 4B illustrates comparing module 218 of FIG. 2 according to another embodiment of the present invention. In FIG. 4B, comparing module 218 is shown to be a differential group delay module for illustrative purposes. Referring to FIG. 4B, comparing module 218 includes respective first and second polarization controllers 406a-b, second multi-symbol delay module 108b, and a polarization beam splitter 408. First polarization controller 406a polarizes optical symbols 45° with reference to a principle axis. Second multi-symbol delay module 108b horizontally and vertically polarizes each symbol, such that horizontal and vertical polarization states experience a differential delay. The differential delay is based on the variable m associated with an m-symbol DPSK technique. For instance, the differential delay corresponds with an m-symbol delay. Second polarization controller 406b rotates symbols 45° that are received from second multi-symbol delay module 108b. Polarization beam splitter 408 interferes the respective horizontal and vertical polarization states to perform the m-symbol DPSK technique. For example, 406a-b may reduce or eliminate thermal and/or acoustic induced phase wander.

Figure 6:
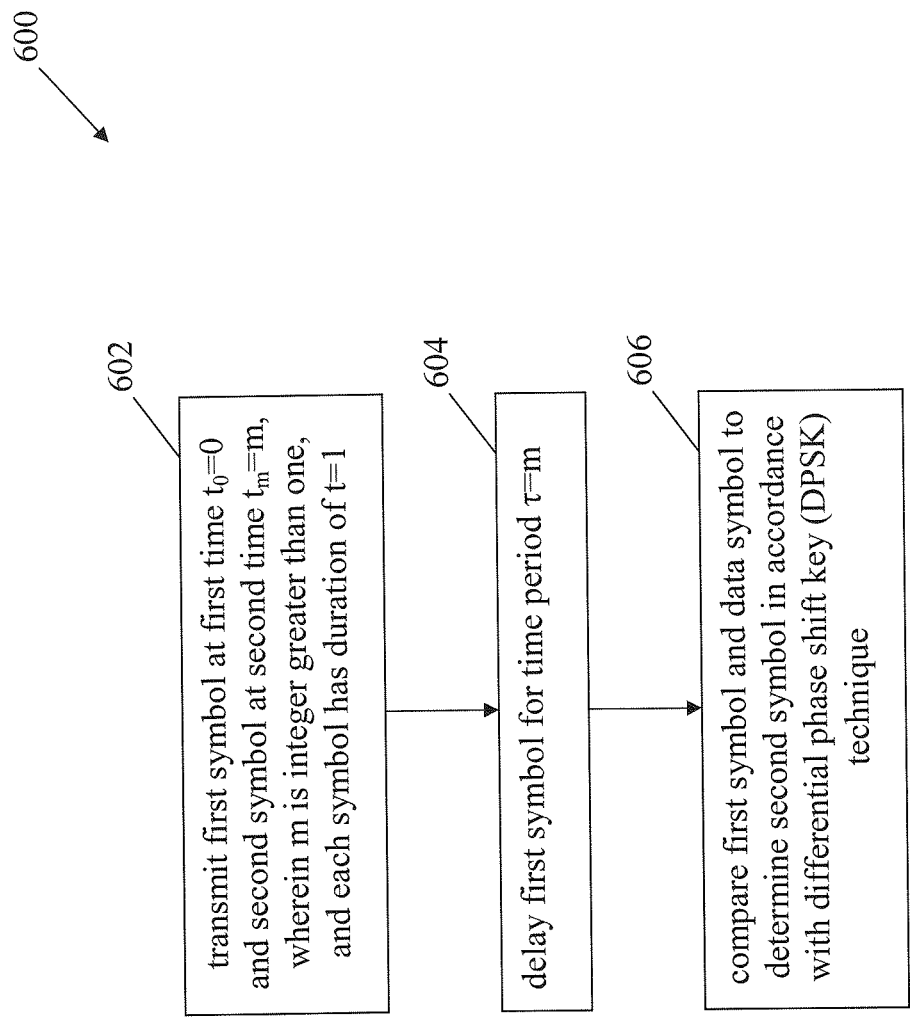
Figure 7:
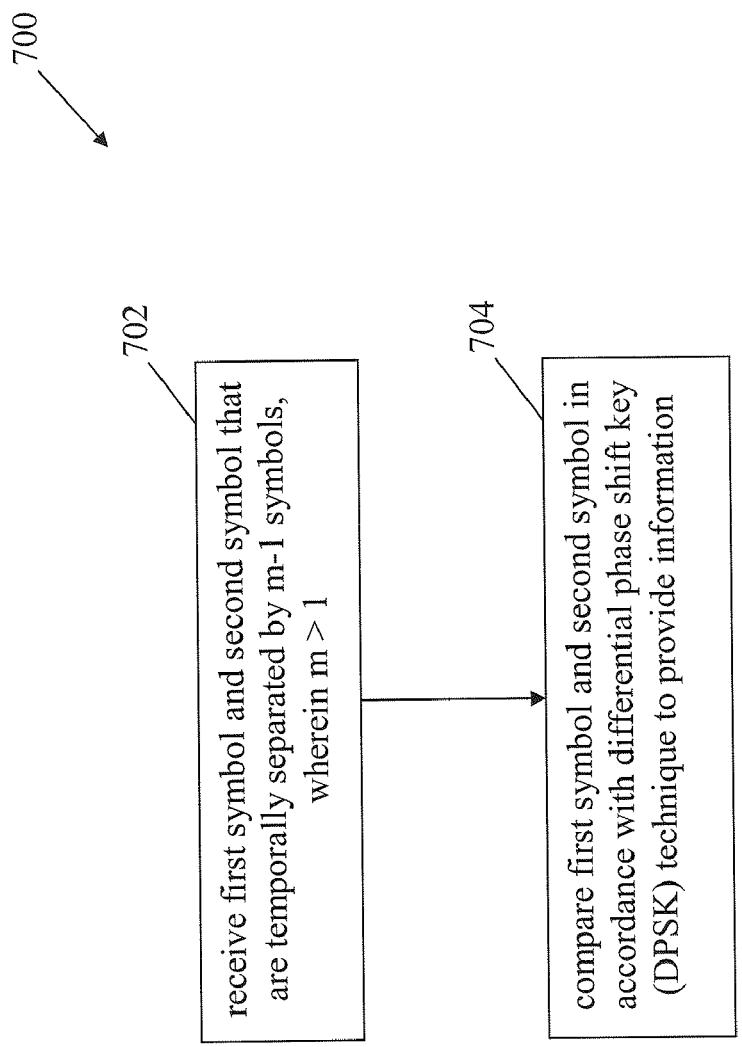
Figure 8:
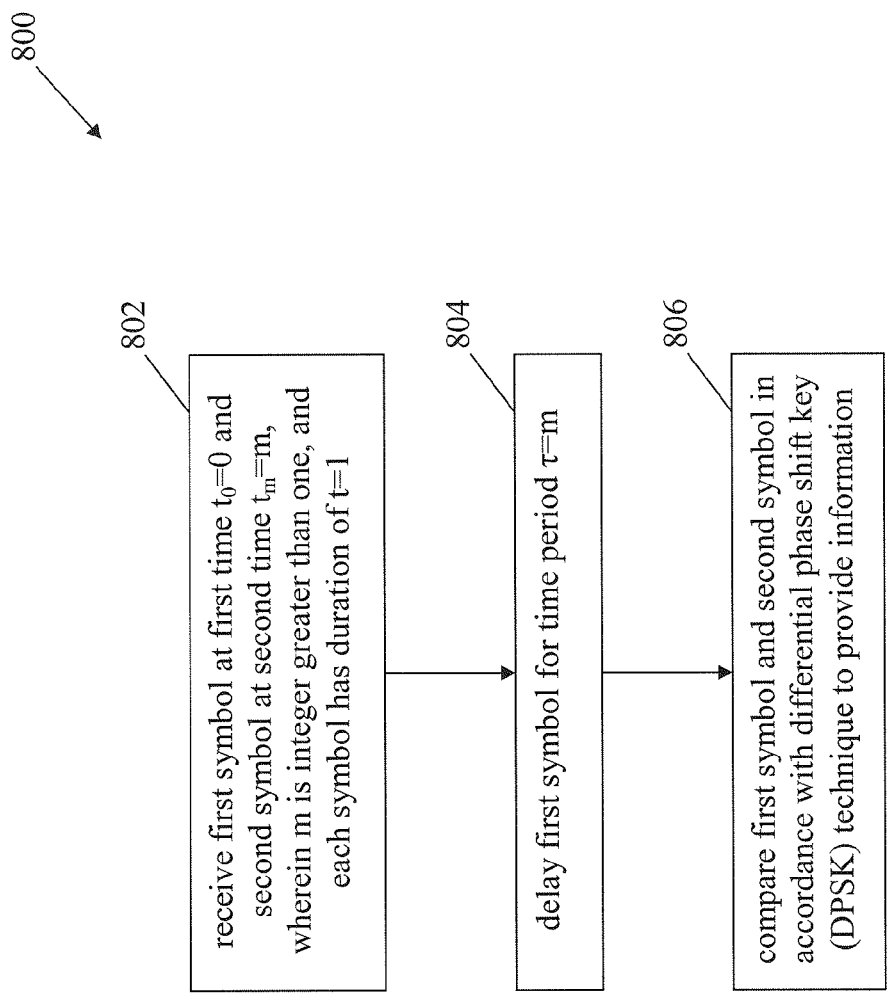

FIGS. 6-8 illustrate flowcharts 600, 700, and 800 of methods of performing respective DPSK techniques in accordance with embodiments of the present invention. The invention, however, is not limited to the description provided by the flowcharts 600, 700, and 800. Rather, it will be apparent to persons skilled in the relevant art(s) from the teachings provided herein that other functional flows are within the scope and spirit of the present invention.

Flowcharts 600, 700, and 800 will be described with continued reference to example rate adjustable DPSK communication system 100 and example elements thereof described above in reference to FIGS. 1-4B, though the methods are not limited to those embodiments.

Referring now to FIG. 6, at block 602, a first symbol is transmitted at a first time instance $t_0=0$ and a second symbol is transmitted at a second time instance $t_m=m$, wherein m is an integer greater than one, and each symbol has a duration of $t=1$. For example, encoder 206 may transmit the first symbol and the second symbol at block 602. At block 604, the first symbol is delayed for a time period $\tau=m$. For instance, first multi-symbol delay module 108a may delay the first symbol at block 604. At block 606, the first symbol and a data symbol are compared to determine the second symbol in accordance with a DPSK technique. For example, comparing module 304 may compare the first and second symbols.

In FIG. 7, at block 702, a first symbol and a second symbol that are temporally separated by m−1 symbols are received. In the embodiment of FIG. 7, m is greater than one. For instance, comparing module 218 may receive the first and second symbols at block 702. At block 704, the first symbol and the second symbol are compared in accordance with a DPSK technique to provide information. For example, comparing module 218 may compare the first and second symbols at block 704.

Referring to FIG. 8, at block 802, a first symbol is received at a first time instance $t_0=0$ and a second symbol is received at a second time instance $t_m=m$, wherein m is an integer greater than one, and each symbol has a duration of $t=1$. For example, comparing module 218 may receive the first and second symbols at block 802. At block 804, the first symbol is delayed for a time period $\tau=m$. For instance, second multi-symbol delay module 108b may delay the first symbol at block 804. At block 806, the first symbol and the second symbol are compared in accordance with a DPSK technique to provide information. For instance, second node 402b or polarization beam splitter 408 may compare the first and second symbols at block 806.

In the embodiments of FIGS. 6-8, the first symbol may correspond with a first portion of an optical signal having a first phase and the second symbol may correspond with a second portion of the optical signal having a second phase.

Figure 9:
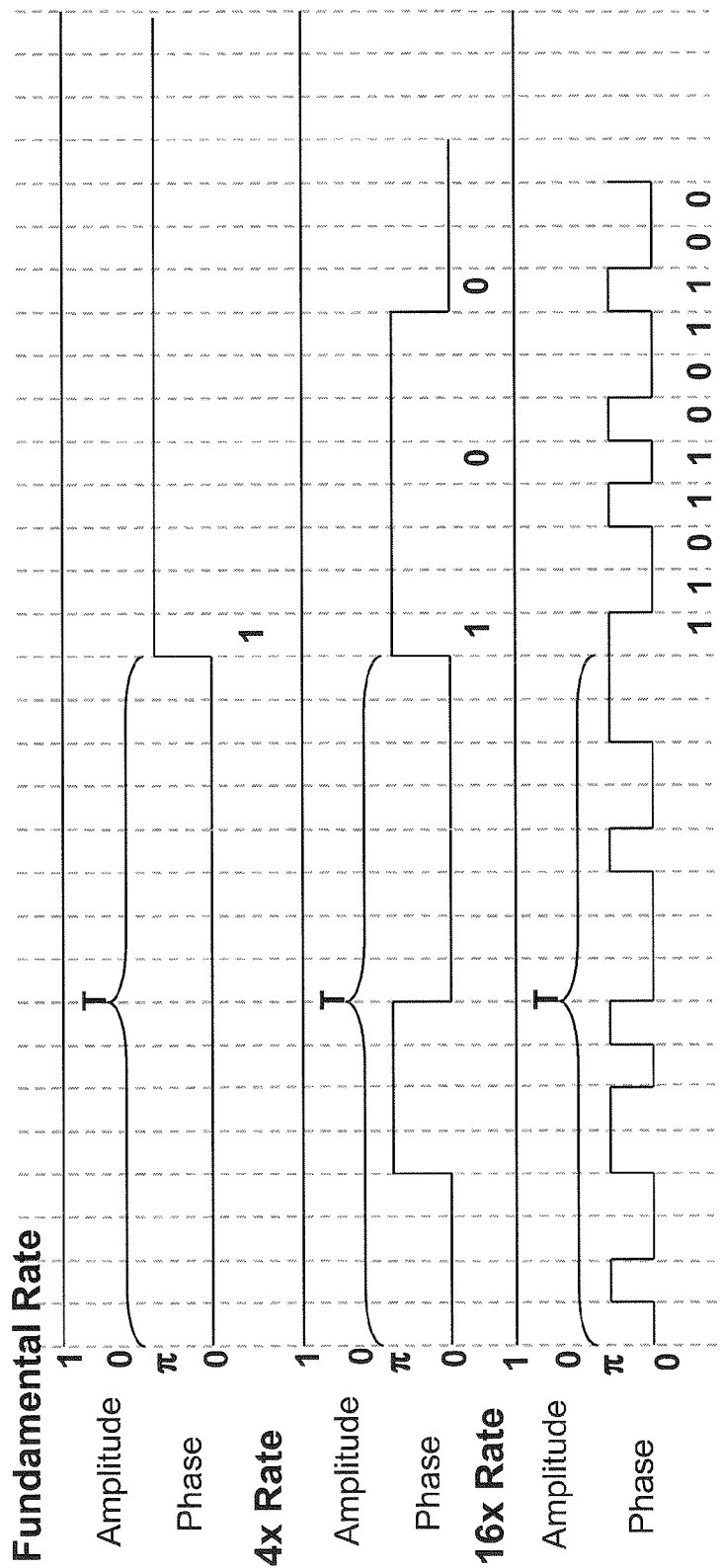
FIG. 9 is a timing diagram showing a comparison between signals having different data rates according to an embodiment of the present invention.

FIG. 9 is a timing diagram showing a comparison between signals having different data rates according to an embodiment of the present invention. Referring to FIG. 9, T represents a fixed delay associated with rate adjustable DPSK communication system 100. For instance, a comparing module 218 may have the fixed delay T. In such a system, symbols that are compared to each other in accordance with the multi-symbol DPSK technique are temporally separated by a fixed time. The temporal proximity of one bit to the next depends on the data rate of the system.

As shown in FIG. 9, at the fundamental data rate of the system, adjacent bits are compared to each other. The fundamental data rate corresponds with m=1 (i.e., a 1-symbol delay). At a data rate that is greater than the fundamental data rate by a factor of four, m=4, such that the first symbol is compared to the fifth symbol, the second symbol is compared to the sixth symbol, and so on. At a data rate that is greater than the fundamental data rate by a factor of sixteen, m=16, such that the first symbol is compared to the seventeenth symbol, the second symbol is compared to the eighteenth symbol, and so on. In FIG. 9, symbols are shown to be compared using an exclusive-OR operation for illustrative purposes. However, the scope of the invention is not intended to be limited in this respect. Referring to FIG. 9, the exclusive-OR operation provides a "1" when the compared symbols are different and a "0" when the compared symbols are the same.

The signals in FIG. 9 are illustrated as NRZ symbols. For instance, the duty cycle of each symbol is substantially 100%. However, persons skilled in the relevant art(s) will recognize that the discussion of FIG. 9 is applicable to RZ symbols, as well.

Figure 10:
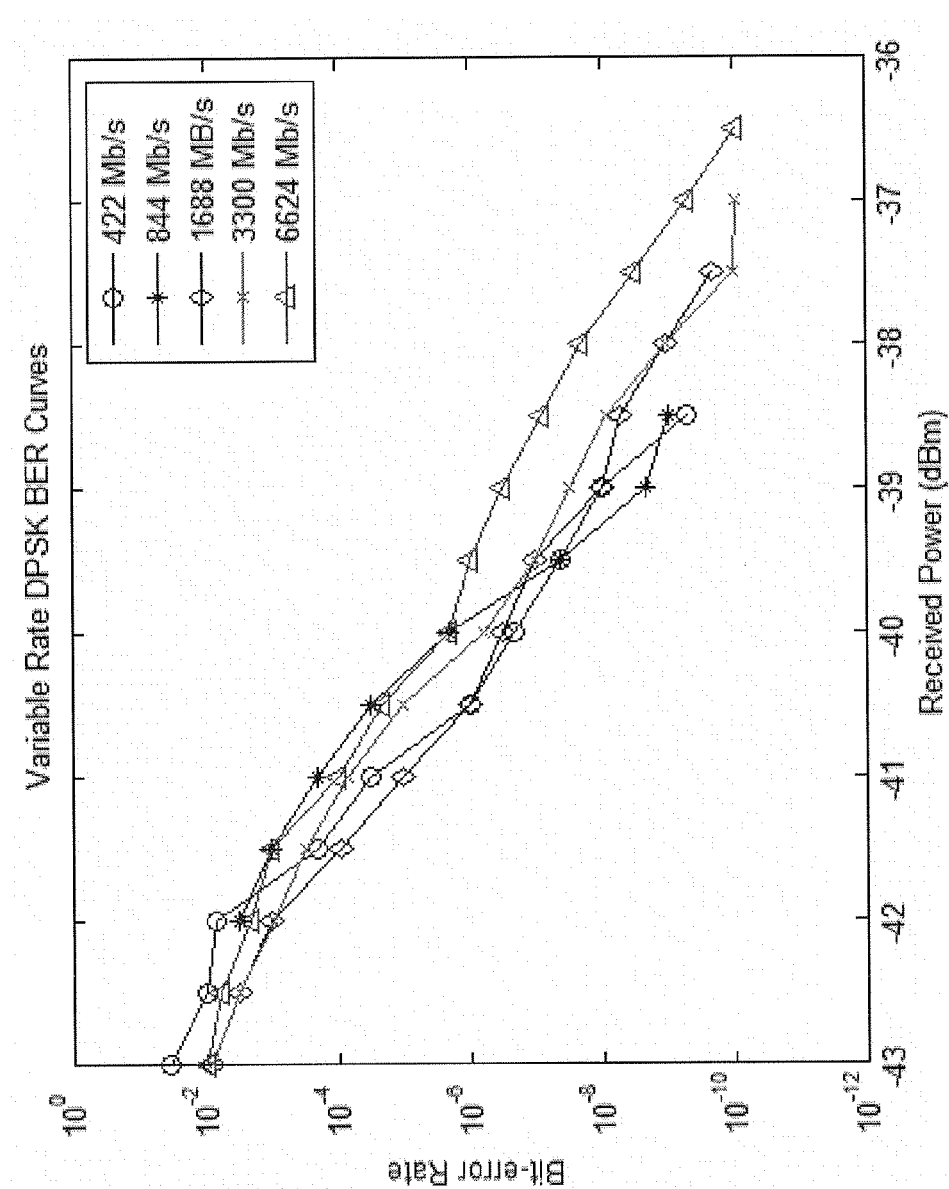
FIG. 10 is an example graphical representation of the performance of communication system 100 using a multi-symbol DPSK technique.

FIG. 10 is an example graphical representation of the performance of communication system 100 using a multi-symbol DPSK technique. In FIG. 10, the bit error rate of rate adjustable DPSK communication system 100 is plotted with respect to received power for a variety of different data rates. FIG. 10 shows plots corresponding to data rates of 422 Mb/s, 844 Mb/s, 1688 Mb/s, 3300 Mb/s, and 6624 Mb/s for illustrative purposes. The multi-symbol DPSK techniques described herein are applicable to any data rate.

III. Example Pulse Carving Embodiments

Figure 11A:
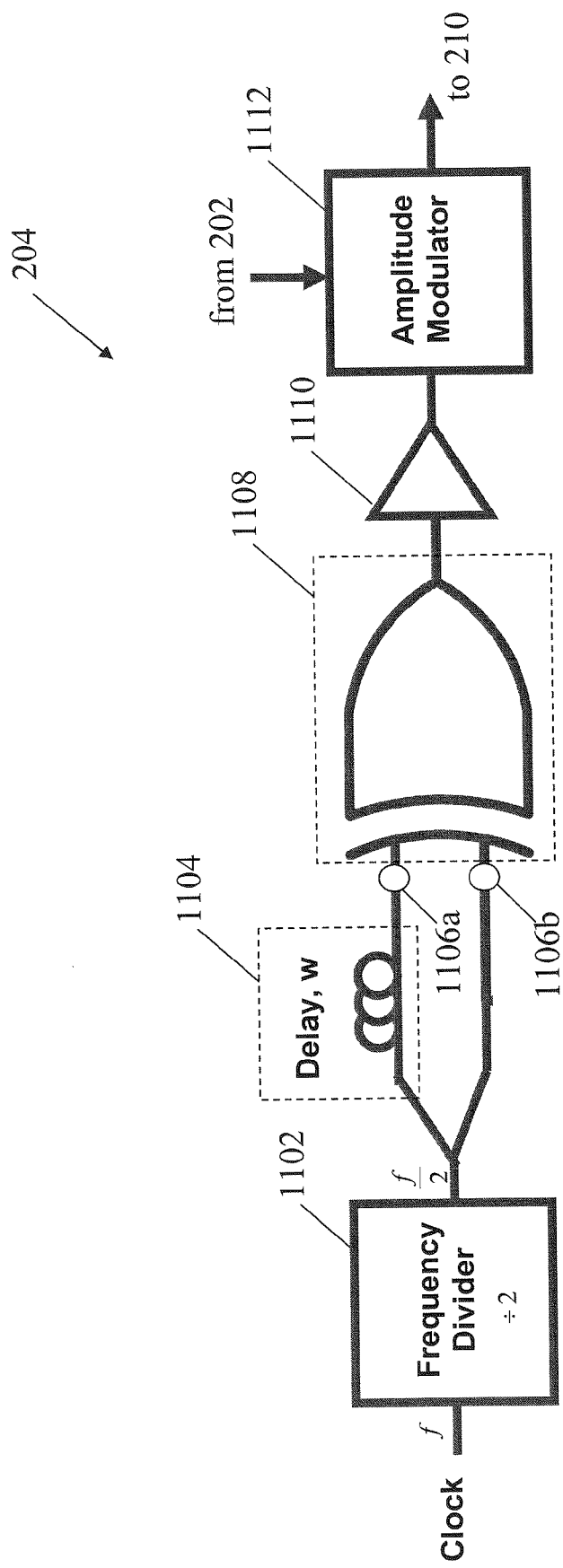
FIGS. 11A and 11B illustrate the optional pulse carving module of FIG. 2 according to example embodiments of the present invention.
Figure 11B:
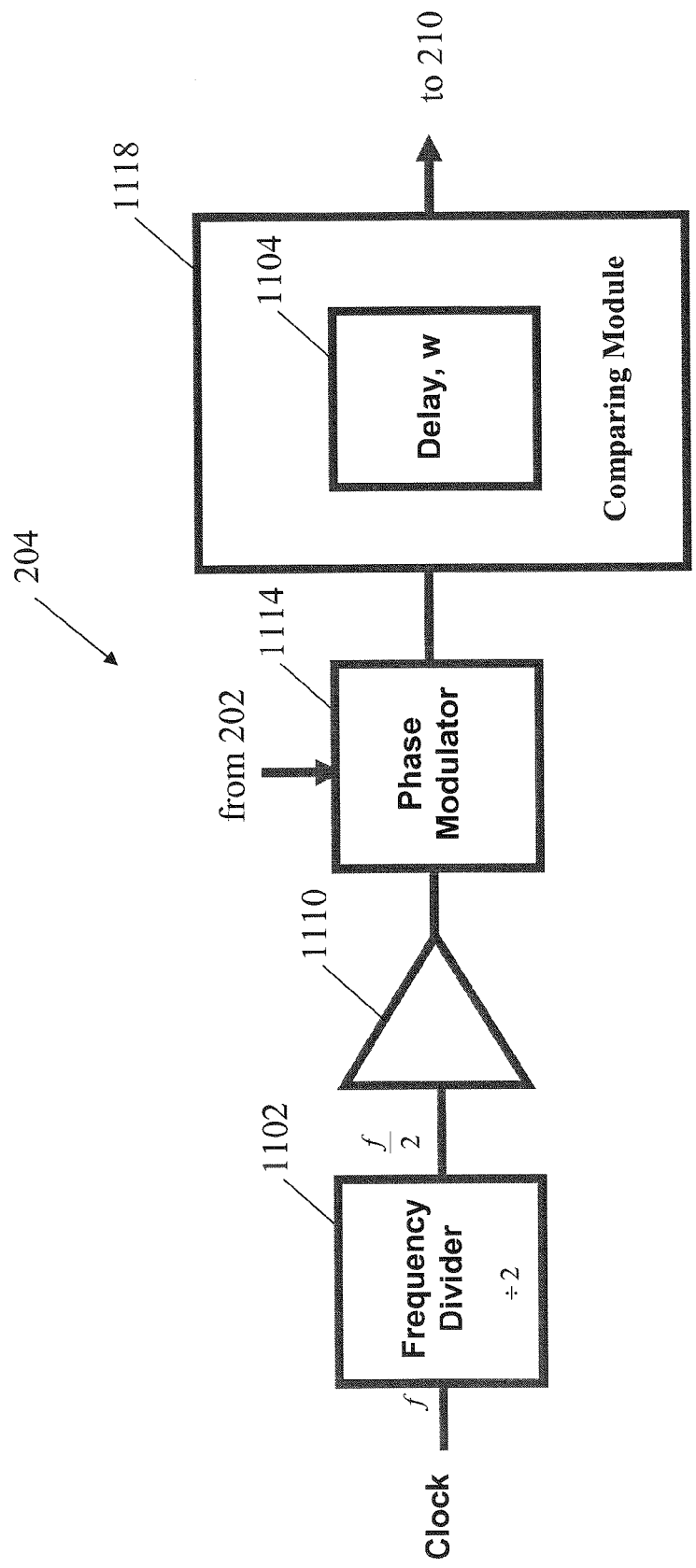

FIGS. 11A-B illustrate optional pulse carving module 204 of FIG. 2 according to example embodiments of the present invention. In FIG. 11A, pulse carving module 204 includes a frequency divider 1102, a pulse-width delay module 1104, a comparing module 1108, a modulation driver 1110, and an amplitude modulator 1112. Frequency divider 1102 divides a frequency f of a clock signal by two to provide a divided clock signal having a second frequency $$f_2 = \frac{f}{2}.$$

Comparing module 1108 has first and second input nodes 1106a-b, respectively. Frequency divider 1102 provides a first clock level of the divided clock signal to second input node 1106b. Pulse-width delay module 1104 delays the first clock level of the divided clock signal for a time period w that is less than the bit period $w_{max}$, associated with the maximum rate of the clock to provide a second clock level to first input node 1106a.

In FIG. 11A, comparing module 1108 performs an exclusive-OR operation based on the first and second clock levels to provide a pulse-carved clock level, having a duty cycle of $w/w_{max}$. Modulation driver 1110 amplifies the pulse-carved clock level. Amplitude modulator 1112 varies the amplitude of the coherent light received from coherent light source 202 based on the pulse-carved clock level to provide a pulse-carved optical clock level. In an example, amplitude modulator 1112 includes a bias voltage stabilization loop to compensate for drift associated with amplitude modulator 1112.

Pulse carving module 204, as shown in FIG. 11A, may be implemented as an electrical pulse carver, though the scope of the present invention is not limited in this respect.

Referring now to FIG. 11B, pulse carving module 204 is shown to include frequency divider 1102, modulation driver 1110, a phase modulator 1114, and a comparing module 1118. Frequency divider 1102 divides a frequency f of a clock signal by two to provide a divided clock signal having a second frequency $$f_2 = \frac{f}{2}.$$

Modulation driver 1110 amplifies the divided clock signal. Phase modulator 1114 combines the divided clock signal and the coherent light received from coherent light source 202 to provide an optical clock signal, having a plurality of optical clock levels. Each optical clock level has a respective phase. For instance, phase modulator 1114 may impress the divided clock signal upon the phase of the coherent light received from coherent light source 202 to provide the optical clock signal.

Comparing module 1118 receives a first clock level of the optical clock signal at a first time instance $t_0=0$. Pulse-width delay module 1104 delays the first clock level for a time period $\tau=W$ (i.e., a time period that is less than the bit period $w_{max}$ associated with the maximum rate of the optical clock signal) to provide a delayed clock level. Comparing module 1118 receives a second clock level of the optical clock signal at a second time instance $t_w=w$. Comparing module 1118 performs an exclusive-OR operation based on the first and second clock levels to provide a pulse-carved clock level. The pulse-carved clock level has an amplitude that is based on the difference between the first and second clock levels.

Pulse carving module 204, as shown in FIG. 11A, may be implemented as an optical pulse carver, though the scope of the present invention is not limited in this respect. For instance, pulse carving module 204 may be implemented as an integrated delay interferometer or a polarization delay interferometer.

Figure 12:
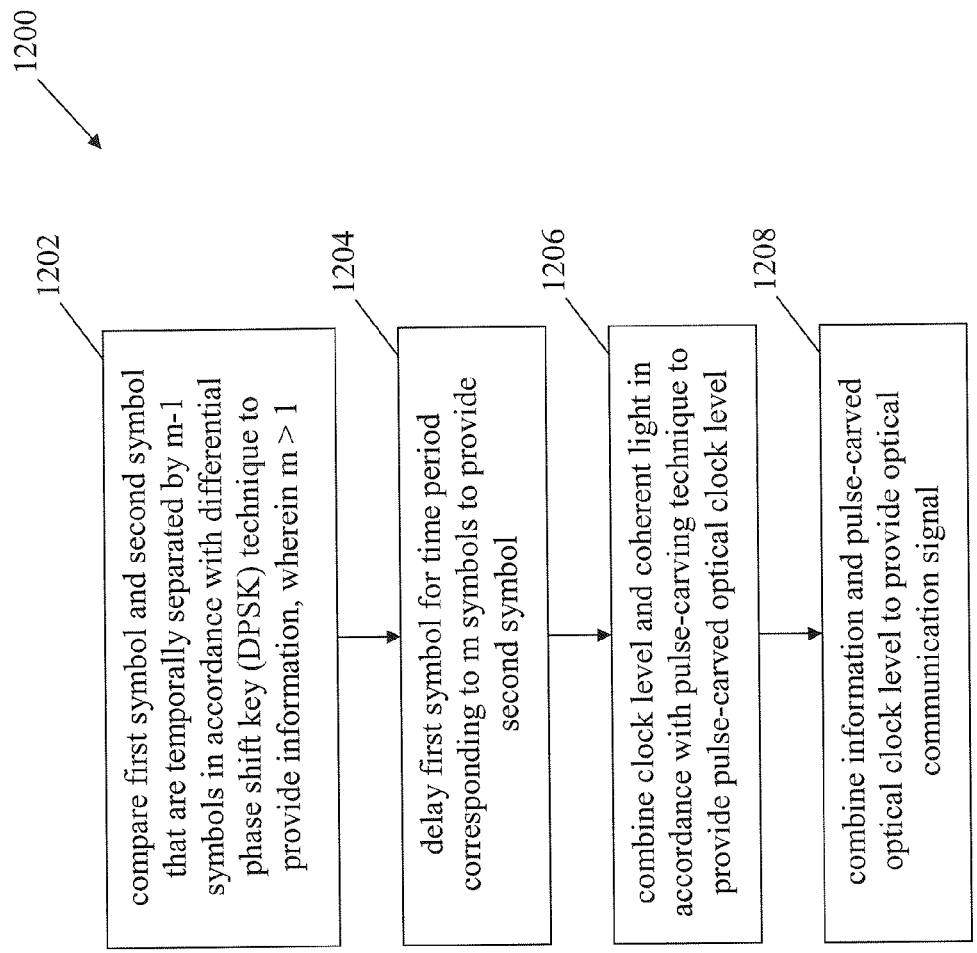
FIG. 12 illustrates a flowchart 1200 of a method of performing a return-to-zero (RZ) DPSK technique in accordance with an embodiment of the present invention.

FIG. 12 illustrates a flowchart 1200 of a method of performing a RZ-DPSK technique in accordance with an embodiment of the present invention. The invention, however, is not limited to the description provided by the flowchart 1200. Rather, it will be apparent to persons skilled in the relevant art(s) from the teachings provided herein that other functional flows are within the scope and spirit of the present invention.

Flowchart 1200 will be described with continued reference to example transmitter 102 and elements thereof shown in FIGS. 2, 3, and 11A-B, though the method is not limited to those embodiments.

Referring now to FIG. 12, at block 1202, a first symbol and a second symbol that are temporally separated by m−1 symbols are compared in accordance with a DPSK technique to provide information, wherein m>1. For example, in an embodiment, comparing module 304 compares the first and second symbols.

At block 1204, the first symbol is delayed for a time period corresponding to m symbols to provide the second symbol. For example, in an embodiment, first multi-symbol delay module 108a delays the first symbol.

At block 1206, a clock level and coherent light are combined in accordance with a pulse-carving technique to provide a pulse-carved optical clock level. For example, in an embodiment, pulse carving module 204 combines the clock level and the coherent light.

At block 1208, the information and the pulse-carved optical clock level are combined to provide an optical communication signal. For example, in an embodiment, phase modulator 210 combines the information and the pulse-carved optical clock level.

Figure 13:
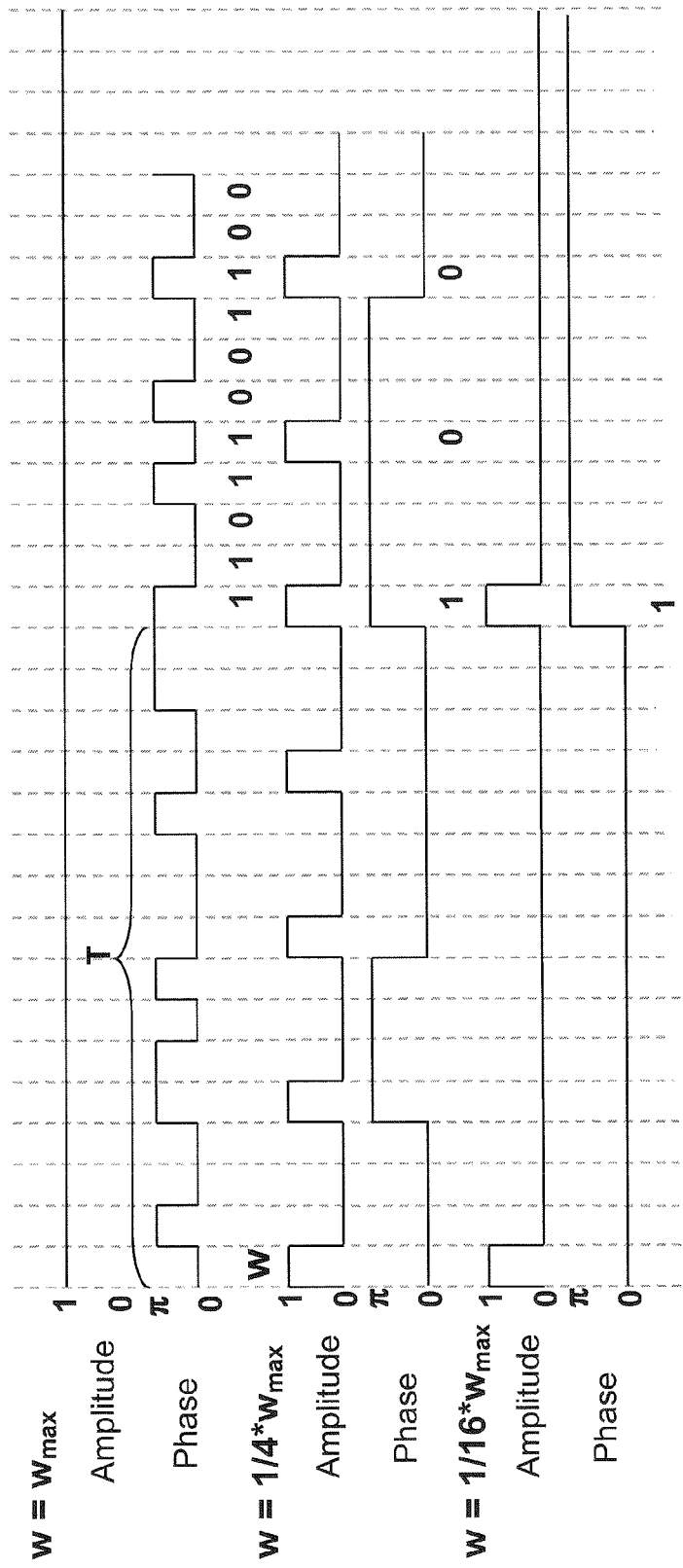
FIG. 13 is a timing diagram showing a comparison between signals to which a pulse carving technique has been applied according to an embodiment of the present invention.

FIG. 13 is a timing diagram showing a comparison between signals to which a pulse carving technique has been applied according to an embodiment of the present invention.

Referring to FIG. 13, T represents a fixed delay associated with rate adjustable DPSK communication system 100. For instance, an interferometer in rate adjustable DPSK communication system 100 may have the fixed delay T. In the embodiment of FIG. 13, $w_{max}$ represents the bit period associated with the maximum rate of the clock that is used to perform the pulse carving technique.

Referring to FIG. 13, the duty cycle of symbols having a period corresponding with the maximum rate of the clock (i.e., $w=w_{max}$) is $1/1=100\%$. The duty cycle of symbols generated using a clock rate that is one-fourth of the maximum rate of the clock (i.e., $w=\frac{1}{4}*w_{max}$) is $\frac{1}{4}=25\%$. The duty cycle of symbols generated using a clock rate that is one-sixteenth of the maximum rate of the clock (i.e., $w=\frac{1}{16}*w_{max}$) is $\frac{1}{16}=6.25\%$. These example duty cycles are provided for illustrative purposes and are not intended to limit the scope of the present invention.

Figure 15:
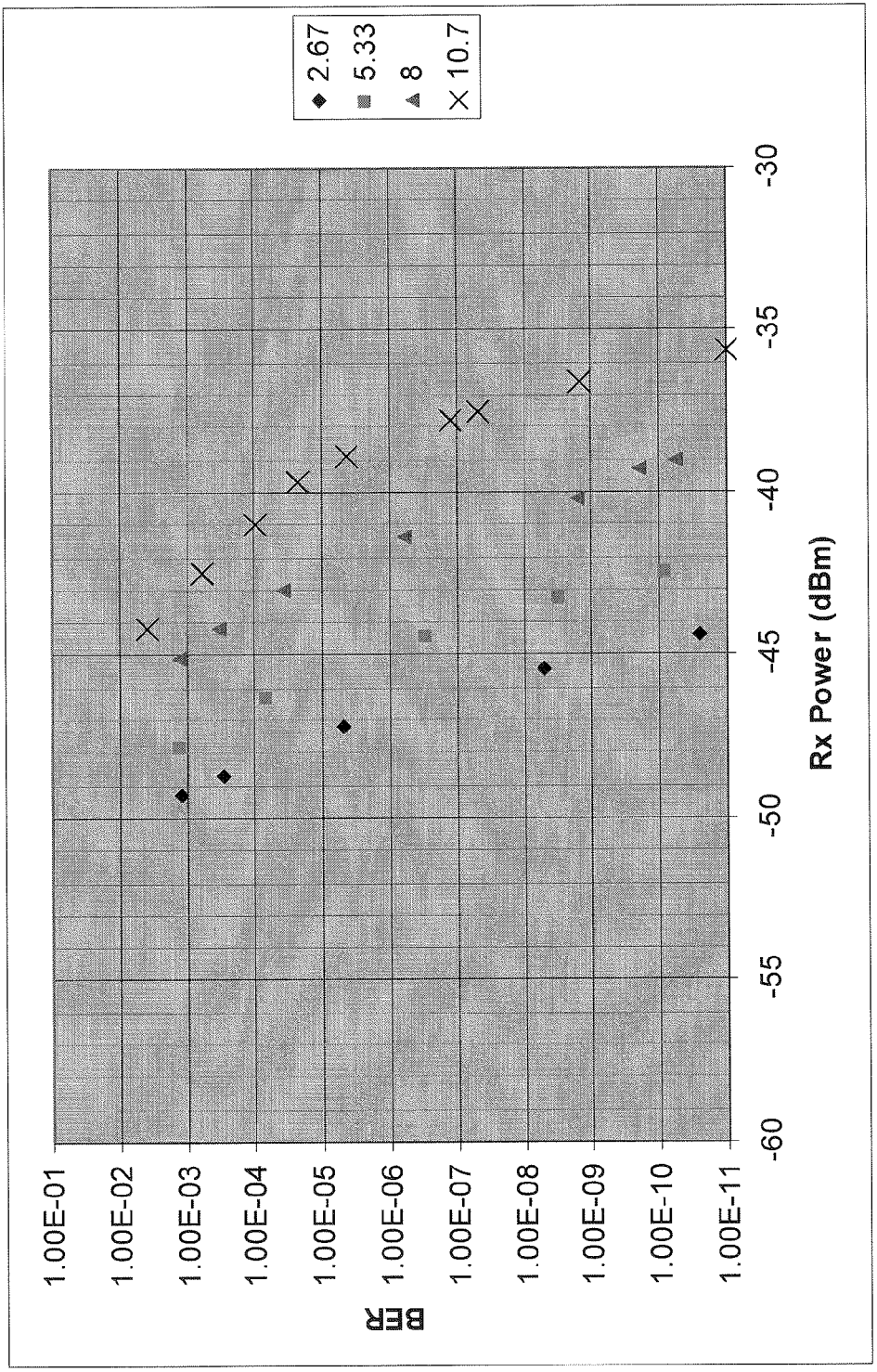
FIGS. 15 and 16 are example graphical representations of the performance of the rate adjustable DPSK communication system in FIG. 1 using respective pulse-carving, multi-symbol DPSK techniques.
Figure 16:
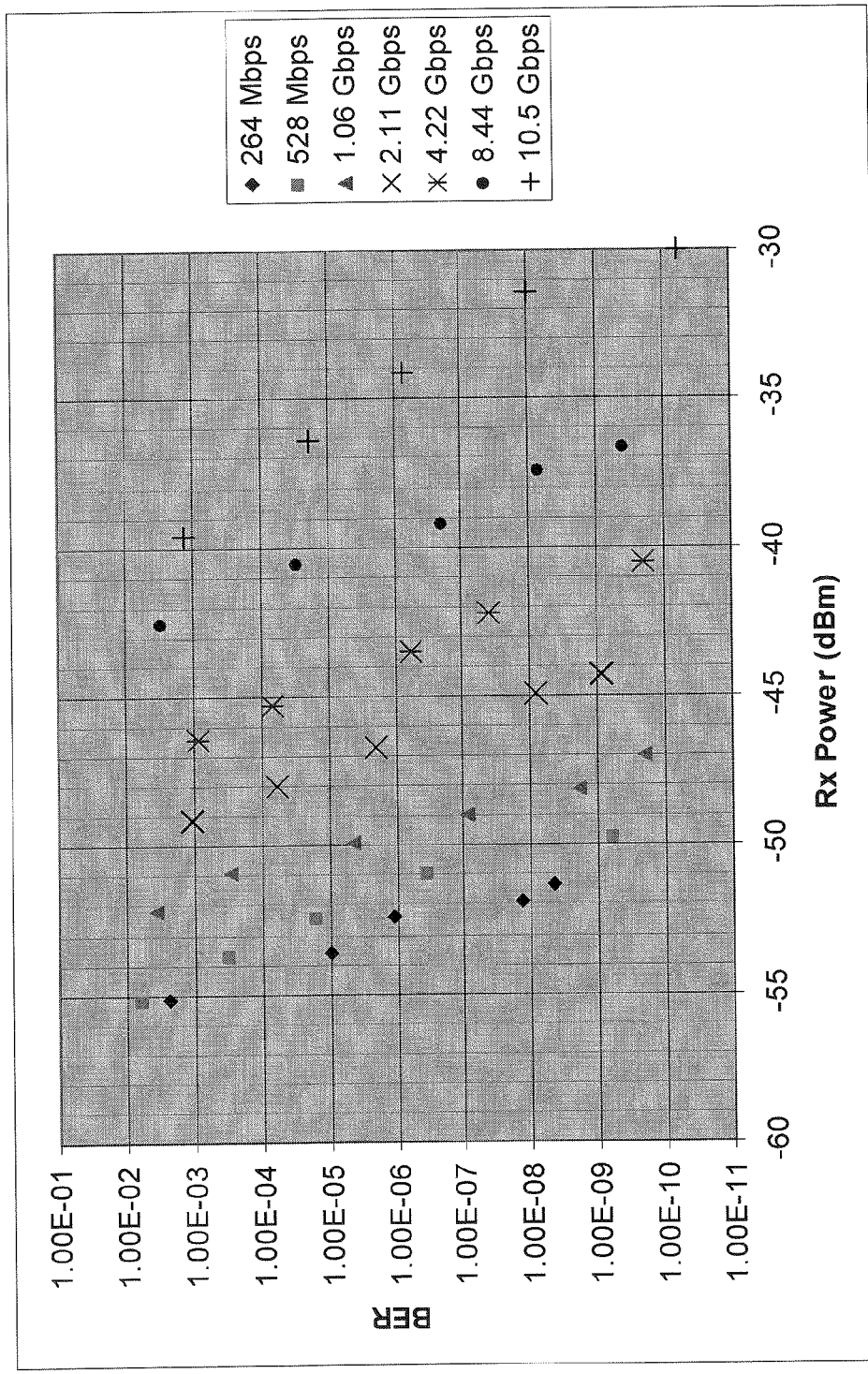

FIGS. 15 and 16 are example graphical representations of the performance of rate adjustable DPSK communication system 100 using respective pulse-carving, multi-symbol DPSK techniques. In FIGS. 15 and 16, the bit error rate of rate adjustable DPSK communication system 100 is plotted with respect to received power for a variety of different data rates.

In FIG. 15, the performance of rate adjustable DPSK communication system 100 is based on a pulse-carving, multi-symbol DPSK technique implemented in an integrated delay interferometer having a period of 375 pico-seconds, as described above with reference to FIG. 11B. FIG. 15 shows plots corresponding to data rates of 2.67 Gb/s, 5.33 Gb/s, 8.0 Gb/s, and 10.7 Gb/s for illustrative purposes.

The performance of rate adjustable DPSK communication system 100 in FIG. 16 is based on a pulse-carving, multi-symbol DPSK technique implemented in a polarization interferometer having a period of 3.8 nano-seconds, also described above with reference to FIG. 11B. FIG. 16 shows plots corresponding to data rates of 264 Mb/s, 528 Mb/s, 1.06 Gb/s, 2.11 Gb/s, 4.22 Gb/s, 8.44 Gb/s, and 10.5 Gb/s for illustrative purposes.

The graphical representations shown in FIGS. 15 and 16 are provided as examples and are not intended to limit the scope of the present invention. The pulse-carving, multi-symbol DPSK techniques described herein are applicable to any data rate and may be implemented using any of the systems, methods, and/or apparatuses described herein.

Figure 17:
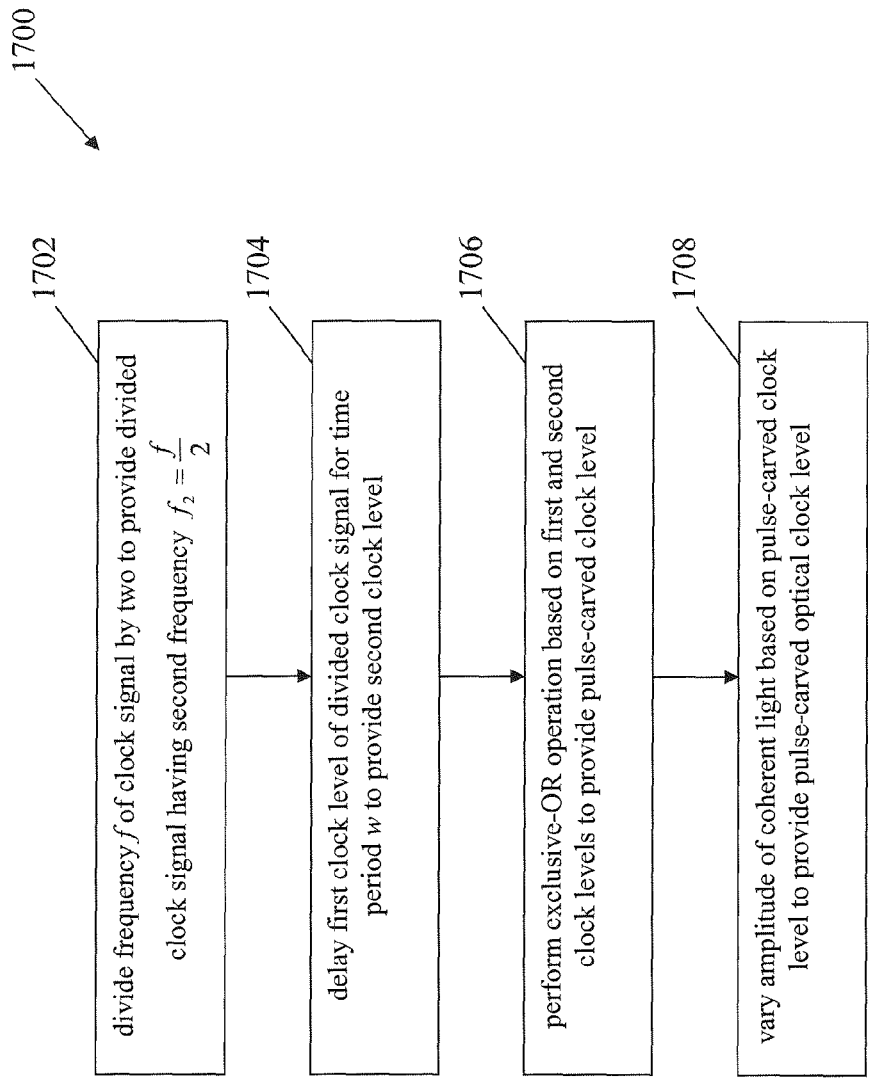
FIGS. 17-18 illustrate flowcharts of methods of combining a clock signal and coherent light in accordance with embodiments of the present invention.
Figure 18:
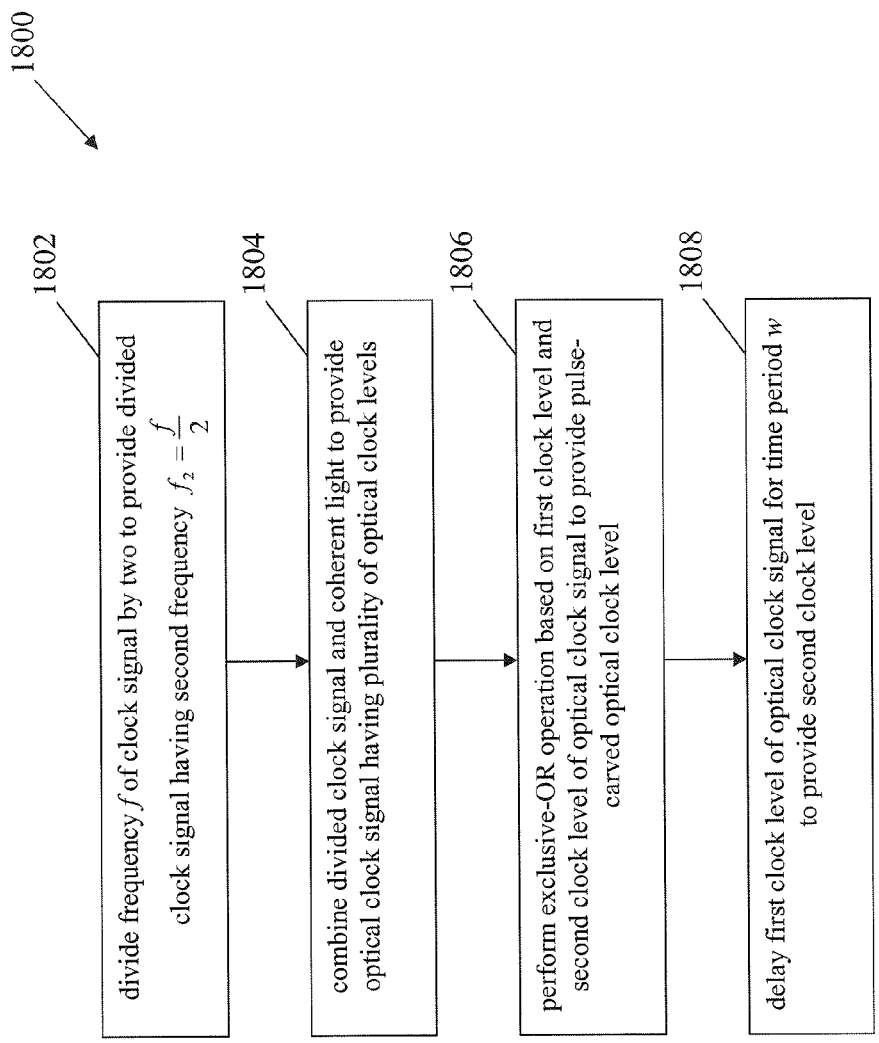

FIGS. 17-18 illustrate flowcharts 1700 and 1800 of methods of combining a clock signal and coherent light in accordance with embodiments of the present invention. The invention, however, is not limited to the description provided by the flowcharts 1700 and 1800. Rather, it will be apparent to persons skilled in the relevant art(s) from the teachings provided herein that other functional flows are within the scope and spirit of the present invention.

Flowcharts 1700 and 1800 will be described with continued reference to the example pulse carving module 204 embodiments described above in reference to FIGS. 11A and 11B, though the methods are not limited to those embodiments.

Referring now to FIG. 17 with reference to FIG. 11A, at block 1702, a frequency f of a clock signal is divided by two to provide a divided clock signal having a second frequency $$f_2 = \frac{f}{2}.$$

For example, in an embodiment, frequency divider 1102 divides the frequency f of the clock signal.

At block 1704, a first clock level of the divided clock signal is delayed for a time period w to provide a second clock level. For example, in an embodiment, pulse-width delay module 1104 delays the first clock level.

At block 1706, an exclusive-OR operation is performed based on the first and second clock levels to provide a pulse-carved clock level. For example, in an embodiment, comparing module 1108 performs the exclusive-OR operation.

At block 1708, an amplitude of the coherent light is varied based on the pulse-carved clock level to provide the pulse-carved optical clock level. For example, in an embodiment, amplitude modulator 1112 varies the amplitude of the coherent light.

Referring now to FIG. 18 with reference to FIG. 11B, at block 1802, a frequency f of a clock signal is divided by two to provide a divided clock signal having a second frequency $$f_2 = \frac{f}{2}.$$

For example, in an embodiment, frequency divider 1102 divides the frequency f of the clock signal.

At block 1804, the divided clock signal and the coherent light are combined to provide an optical clock signal having a plurality of optical clock levels. For example, in an embodiment, phase modulator 1114 combines the divided clock signal and the coherent light.

At block 1806, an exclusive-OR operation based on a first clock level and a second clock level of the optical clock signal is performed to provide the pulse-carved optical clock level. For example, in an embodiment, comparing module 1118 performs the exclusive-OR operation.

At block 1808, the first clock level of the optical clock signal is delayed for a time period w to provide the second clock level. For example, in an embodiment, pulse-width delay module 1104 delays the first clock level.

IV. Other Embodiments

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Moreover, firmware, software, routines, instructions, etc. may be described herein as performing certain actions. However, it should be appreciated that such descriptions are merely for convenience and that such actions in fact result from computing devices, processors, controllers, or other devices executing the firmware, software, routines, instructions, etc.

V. Conclusion

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed is:

1. In a communication system, a method comprising:
adjusting a variable symbol delay m based on a rate of data demodulation in accordance with a multi-symbol differential phase shift key (DPSK) technique;
comparing a first symbol and a second symbol that are temporally separated by m−1 symbols in accordance with the multi-symbol DPSK technique to provide information, wherein m >1; and
delaying the first symbol for a time period corresponding to m symbols to provide the second symbol.

2. An optical communication apparatus comprising:
means for adjusting a variable symbol delay m based on a rate of data demodulation in accordance, with a multi-symbol differential phase shift key (DPSK) technique;
means for comparing a first symbol and a second symbol that are temporally separated by m−1 symbols in accordance with the multi-symbol DPSK technique to provide information, wherein m >1; and
a multi-symbol delay module to delay the first symbol for a time period corresponding to m symbols to provide the second symbol.

3. In a communication system, a method comprising:
adjusting a variable symbol delay m based on a rate of data demodulation in accordance with a multi-symbol differential phase shift key (DPSK) technique;
receiving a first symbol and a second symbol that are temporally separated by m−1 symbols, wherein m >1; and
comparing the first symbol and the second symbol in accordance with the multi-symbol DPSK technique to provide information;
wherein the first symbol corresponds with a first portion of an optical signal having a first phase and the second symbol corresponds with a second portion of the optical signal having a second phase.

4. The method of claim 3, wherein comparing the first symbol and the second symbol includes performing a logical exclusive-OR operation based on the first symbol and the second symbol.

5. The method of claim 3, wherein the first symbol is defined as a first single bit, and wherein the second symbol is defined as a second single bit.

6. The method of claim 3, wherein each of the first and second symbols includes more than one bit.

7. The method of claim 3, further comprising:
changing m from a first integer value to a second integer value that is different from the first integer value.

8. In a communication system, a method comprising:
receiving a first symbol at a first time instance $t_0=0$ and a second symbol at a second time instance $t_m=m$, wherein m is a variable symbol delay determined based upon a rate of data demodulation, wherein m is an integer greater than one, and each symbol has a duration of t=1;
delaying the first symbol for a time period τ=M; and
comparing the first symbol and the second symbol in accordance with a differential phase shift key (DPSK) technique to provide information;
wherein the first symbol corresponds with a first portion of an optical signal having a first phase and the second symbol corresponds with a second portion of the optical signal having a second phase.

9. The method of claim 8, wherein comparing the first symbol and the second symbol includes performing a logical exclusive-OR operation based on the first symbol and the second symbol.

10. The method of claim 8, wherein the first symbol is defined as a first single bit, and wherein the second symbol is defined as a second single bit.

11. The method of claim 8, wherein each of the first and second symbols includes more than one bit.

12. The method of claim 8, further comprising:
changing m from a first integer value to a second integer value that is different from the first integer value.

13. A receiver comprising:
a node to receive a first symbol at a first time instance $t_0=0$ and a second symbol at a second time instance $t_m=m$, and to determine a variable symbol delay m based upon a rate of data demodulation, wherein m is an integer greater than one, and each symbol has a duration of t=1;
means for comparing the first symbol and the second symbol in accordance with a differential phase shift key (DPSK) technique to provide information; and
a multi-symbol delay module coupled between the node and the means for comparing to delay the first symbol for a time period $\tau=m$;
wherein the first symbol corresponds with a first portion of an optical signal having a first phase and the second symbol corresponds with a second portion of the optical signal having a second phase.

14. The receiver of claim 13, wherein the multi-symbol delay module includes a differential group delay.

15. The receiver of claim 13, wherein the means for comparing is configured to perform a logical exclusive-OR operation based on the first symbol and the second symbol.

16. The receiver of claim 13, wherein the first symbol is defined as a first single bit, and wherein the second symbol is defined as a second single bit.

17. The receiver of claim 13, wherein each of the first and second symbols includes more than one bit.

18. The receiver of claim 13, wherein the receiver is an interferometer, and wherein m equals a data rate associated with the first and second portions of the optical signal multiplied by a fixed time delay associated with the interferometer.

* * * * *